US009015223B2

(12) United States Patent
Oksanen et al.

(10) Patent No.: US 9,015,223 B2
(45) Date of Patent: Apr. 21, 2015

(54) METHOD AND DEVICE FOR PROVIDING TRIGGERING INFORMATION TO SEVERAL CLIENTS USING AN ELECTRONIC GUIDE

(75) Inventors: Ilkka Oksanen, Espoo (FI); Uwe Rauschenbach, Poing (DE)

(73) Assignee: Nokia Siemens Networks Oy, Espoo (FI)

( * ) Notice: Subject to any disclaimer, the term of this patent is extended or adjusted under 35 U.S.C. 154(b) by 678 days.

(21) Appl. No.: 13/144,514

(22) PCT Filed: Jan. 14, 2010

(86) PCT No.: PCT/EP2010/050375
§ 371 (c)(1), (2), (4) Date: Jul. 22, 2011

(87) PCT Pub. No.: WO2010/081844
PCT Pub. Date: Jul. 22, 2010

(65) Prior Publication Data
US 2011/0276617 A1 Nov. 10, 2011

(30) Foreign Application Priority Data
Jan. 14, 2009 (EP) .................................... 09100038

(51) Int. Cl.
*G06F 15/16* (2006.01)
*G06F 13/00* (2006.01)
*H04H 60/13* (2008.01)
*H04H 60/44* (2008.01)
*H04H 60/72* (2008.01)

(52) U.S. Cl.
CPC ............... *H04H 60/13* (2013.01); *H04H 60/44* (2013.01); *H04H 60/72* (2013.01)

(58) Field of Classification Search
CPC ....... H04H 60/31; H04H 60/44; H04H 60/72; H04H 60/73
USPC .............. 725/42, 46, 39, 14, 34, 40; 709/224, 709/231, 201, 217
See application file for complete search history.

(56) References Cited

U.S. PATENT DOCUMENTS 7,568,214 B2 7/2009 Leak et al.
2006/0010470 A1 * 1/2006 Kurosaki et al. ................ 725/46

(Continued)

FOREIGN PATENT DOCUMENTS

EP 1 111 922 A2 6/2001
EP 1 858 184 A2 11/2007

(Continued)

OTHER PUBLICATIONS

Paila et al.: "FLUTE—File Delivery over Unidirectional Transport", Network Working Group, Request for Comments: 3926, Category: Experimental, Oct. 2004, pp. 1-35.

(Continued)

*Primary Examiner* — Jungwon Chang
(74) *Attorney, Agent, or Firm* — Laurence A. Greenberg; Werner H. Stemer; Ralph E. Locher

(57) ABSTRACT

A method and a device for data processing. The method includes the following steps: (i) a triggering information is provided to several clients via an electronic guide; and (ii) based on the triggering information, each of the several clients determines, in particular via filtering parameters, whether or not to react to the triggering information.

18 Claims, 4 Drawing Sheets

(56) References Cited

U.S. PATENT DOCUMENTS

| | | | | |
|---|---|---|---|---|
| 2006/0128418 | A1 | 6/2006 | Quelle et al. | |
| 2006/0200842 | A1* | 9/2006 | Chapman et al. | 725/34 |
| 2006/0206912 | A1* | 9/2006 | Klarfeld et al. | 725/40 |
| 2007/0271591 | A1 | 11/2007 | Izumi et al. | |
| 2008/0154958 | A1 | 6/2008 | Sloo et al. | |
| 2008/0168497 | A1* | 7/2008 | Mitchem | 725/42 |
| 2008/0276275 | A1* | 11/2008 | Ellis | 725/39 |
| 2009/0199238 | A1* | 8/2009 | Kummer | 725/39 |
| 2009/0328090 | A1* | 12/2009 | Randolph et al. | 725/14 |
| 2010/0325648 | A1* | 12/2010 | Matsuyama et al. | 725/14 |

FOREIGN PATENT DOCUMENTS

| | | | |
|---|---|---|---|
| GB | 2370456 | A | 6/2002 |
| WO | 2006/064338 | A1 | 6/2006 |

OTHER PUBLICATIONS oma, “Mobile Broadcast Services”, Approved Version 1.0—Feb. 12, 2009, Open Mobile Alliance, OMA-TS-BCAST_Services-V1_0-20090212-A, pp. 1-179.

* cited by examiner

FIG. 4

```xml
<AudienceMeasurement>
        <Filter id="urn:oma:bcast:amfilter:nokia:12345" command="new">
                <RandomSelector probability="123"/>
                <TerminalID type="msisdn">
                        <Range from="491730000000" to="491739999999"/>
                <TerminalID>
        </Filter>
        <Address>
                <URL>https://amserver.example.com/amconfig.cgi</URL>
        </Address>
        <Configuration>
                <ReportURL>https://amserver.example.com/amreport.cgi</ReportURL>
                <MeasurementItems>
                        <!-- signal here what to measure
                        ...
                        -->
                </MeasurementItems>
                <MeasurementStart>2008-11-22T00:00:00</MeasurementStart>
                <MeasurementEnd>2009-01-22T00:00:00</MeasurementEnd>
                <ReportingFrequency>P1D</ReportingFrequency>
        </Configuration>
</AudienceMeasurement>
```

METHOD AND DEVICE FOR PROVIDING TRIGGERING INFORMATION TO SEVERAL CLIENTS USING AN ELECTRONIC GUIDE

BACKGROUND OF THE INVENTION

Field of the Invention

The invention relates to a method and to a device for data processing.

An OMA BCAST standard has been developed to provide a broad range of mobile broadcast services over broadcast (one-to-many) and unicast (one-to-one) transport. Its main use refers to offering Mobile TV and similar services. The standard specifies the service layer part of the complete system, which then in principle can be adapted on top of any IP based distribution system. Currently supported distribution systems are DVB-H, 3GPP MBMS, 3GPP2 BCMCS, DVB-SH, WiMAX and FLO. The OMA BCAST standard comprises in particular:

Stream distribution of content;

File distribution of content;

Service discovery and Service Guide;

Service and content protection of distributed content;

Service provisioning (purchasing).

The Open Mobile Alliance (OMA) is an industry-led, non-profit organization formed to develop interoperable and network agnostic service enablers working across countries, operators and mobile terminals.

Audience measurement (AM) measures how many people are in an audience at a given point in time, usually in relation to a radio listenership or to a television viewership.

BCAST 1.0 standard does not provide any audience measurements.

In case of broadcast services that can be consumed by many terminals at the same time, it is required that the terminals collect the measurement data and send them to the service provider, as there is no opportunity at the head end to track service consumption by, e.g., monitoring session set-up.

This assumes that all terminals participating in the measurement are triggered and/or configured one by one using a point-to-point data connection between the server and the terminal. Here, triggering means that a terminal needs to be informed that it is expected to take part in a measurement campaign. Configuration means that the terminal is informed about what to measure and, e.g., when, how and to whom to report the results of such measurement.

Such individual addressing of a terminal is required if the service provider wants to select exactly which terminals to be a part of the measurement from the pool of all terminals. Individual addressing of each terminal consumes a significant amount of data transmission bandwidth and server resources.

BRIEF SUMMARY OF THE INVENTION

The problem to be solved is to overcome the disadvantages stated above and in particular to provide for an audience measurement approach that efficiently allows to observe a popularity of a service provided.

This problem is solved according to the features of the independent claims. Further embodiments result from the depending claims.

In order to overcome this problem, a method for data processing is provided comprising the steps of a triggering information is provided to several clients via an electronic guide;

based on said triggering information, each of the several clients determines in particular via filtering parameters whether or not to react on said triggering information.

It is noted that said electronic guide may comprise or may be associated with any kind of service guide, service guide functionality, meta data, meta data functionality, notification, notification mechanism (e.g., notification function or notification framework), program guide, or any information related thereon.

This approach efficiently allows for, e.g., a service provider obtaining approximate statistics of user behavior as randomly selected groups of clients provide sufficient user measurement data for the service provider to observe or determine a popularity of at least one service with calculated error margins.

The attractiveness of the audience measurement feature increases with the service provider being able to make such measurements without having to address each terminal individually. Hence, the triggering information can be conveyed via broadcast to several clients. The clients on their part determine whether or not to react on said broadcasted triggering information.

Said filtering parameters can be utilized on the client side to decide whether or not to react and in particular as how to react on the triggering information provided.

In an embodiment, such triggering information is broadcasted to the several clients.

Hence, a broadcast network can be utilized to efficiently convey said triggering information from, e.g., a server (or several severs, e.g., associated with an operator or a service or network provider), towards the several clients.

According to a further embodiment, the triggering information comprises at least one configuration parameter.

Hence, the triggering information can be used to convey the at least one configuration parameter to the several clients. In another embodiment, a client reacts on said triggering information by requesting and/or reading configuration parameters from at least one server, in particular via a point-to-point connection.

In particular, the client may actively pull said configuration parameters or it will be provided with the configuration parameters by the at least one server.

Thus, the client may utilize address parameters that indicate where to fetch the configuration parameters; such address parameters could be provided (e.g., broadcasted) with or in the triggering information.

In a next embodiment, the at least one server allows or rejects configuring the client.

Hence, this allows for a server-based post-filtering step to decide at the at least one server, whether or not and in particular which of the clients shall participate in a measurement process.

It is also an embodiment that the client starts a measurement and/or tracking process according to the configuration parameters.

Pursuant to another embodiment, the result of the measurement and/or tracking process is conveyed to the at least one server.

Such results may be conveyed via a point-to-point network, i.e. from the client to the at least one server. Such point-to-point network may comprise a HTTP communication or a SMS. In particular, the point-to-point network can be a different network compared to the broadcast network. However, the broadcast network and/or the point-to-point network may each (or both) be a fixed network or a wireless network.

According to an embodiment, the client reacts on said triggering information as a result of a random process run at the client.

It is noted that such random process may be a pseudo-random process, in particular with a certain degree of coincidence.

According to another embodiment, such random process may comprise:

- computing an substantially arbitrary number in particular within a given range and comparing this substantially arbitrary number with a given number or a given range of numbers;
- in case the substantially arbitrary number and the given number or the given range of numbers match, the client reacts on the triggering information.

In yet another embodiment, said filtering parameters comprise items that are stored within or can be derived by from the client, in particular comprising at least one of the following:

- IMEI, IMSI, MSISDN or ranges thereof;
- user profile data;
- subscribed services;
- model, brand, type of client device;
- operator of the network into which the client is booked in;
- type of contract;
- validity of the trigger.

Regarding the validity of the trigger mentioned, the terminals may be allowed to react (only) within a given time interval. Hence, said trigger may be valid for the duration of this time interval only.

According to a next embodiment, said triggering information indicates for each of the several clients as how to determine whether or not to react on said triggering information.

Hence, the way to react or to find out whether or not to react and eventually provide measurement information towards the server(s) can be indicated by said triggering information. The triggering information may in particular indicate which kind of (random or pseudo-random) calculation to be conducted at the client.

Pursuant to yet an embodiment, the triggering information comprises a command field indicating whether the triggering information is

- a new trigger;
- a termination trigger; or
- an update trigger.

According to another embodiment, said electronic guide comprises an electronic service guide, an electronic program guide or a notification mechanism.

The problem stated above is also solved by a device comprising a and/or being associated with a processor unit and/or a hard-wired circuit and/or a logic device that is arranged such that the method as described herein is executable thereon.

According to an embodiment, the device is a communication device, in particular a or being associated with a client or a server, wherein the server may in particular provide broadcast information towards at least one client.

The problem stated supra is further solved by a communication system comprising the device as described herein.

BRIEF DESCRIPTION OF THE SEVERAL VIEWS OF THE DRAWING

Embodiments of the invention are shown and illustrated in the following figures:

FIG. 4 shows an exemplary notation of a triggering information that may be embedded in an SG as an XML data structure.

DESCRIPTION OF THE INVENTION

Figure 1:
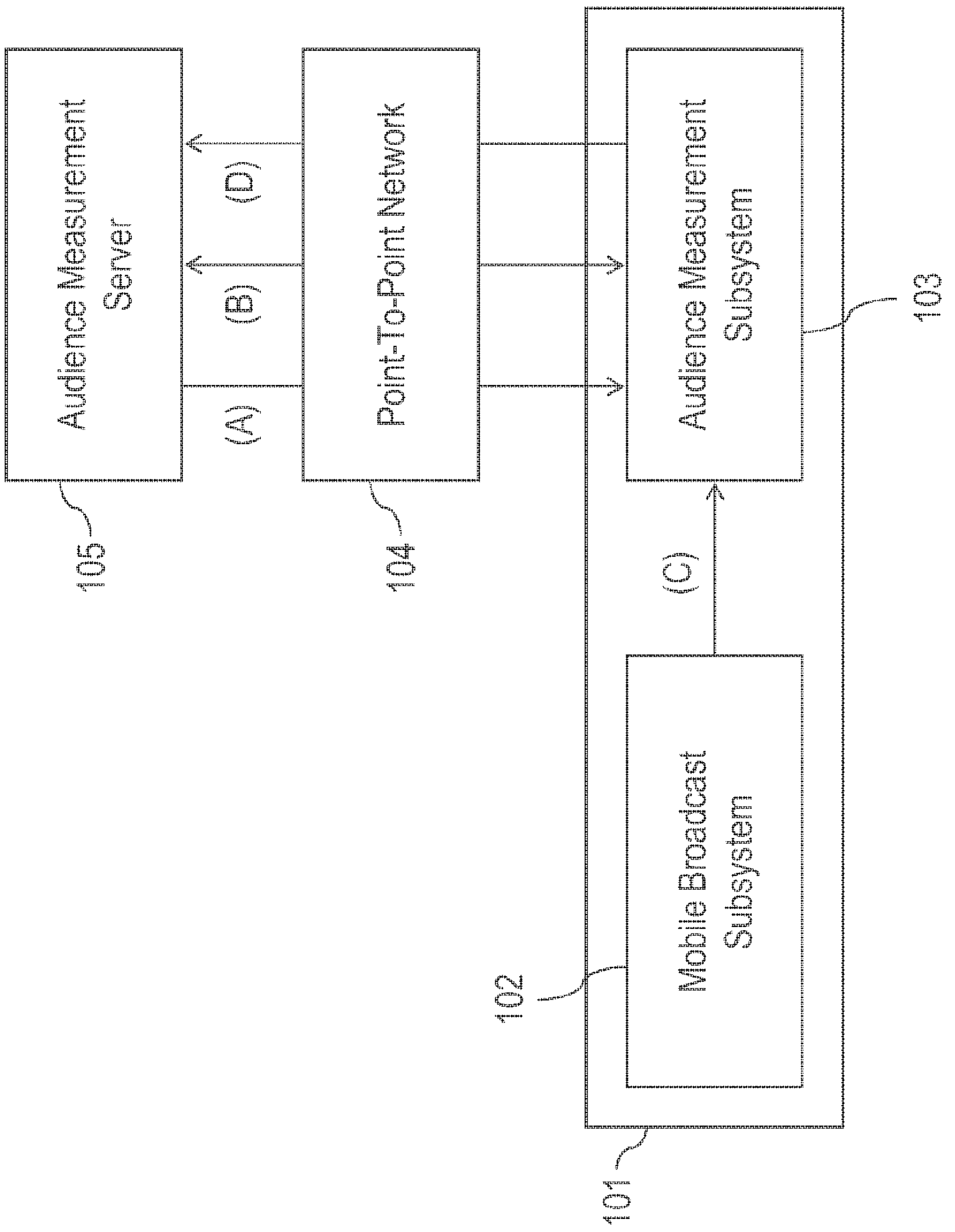
FIG. 1 shows a block diagram comprising a terminal with a mobile broadcast subsystem and an audience measurement (AM) subsystem, wherein the terminal is connected via a point-to-point network to an audience measurement (AM) server.

Hereinafter, at least one service is provided to a terminal (also referred to as client (device)) via a network by at least one server. One example of such service is a mobile TV broadcast. However, the approach is not limited to such an application. Instead, any application, e.g., comprising audio, video and/or user data may be applicable in association with the approach described herein.

The approach provided allows for a (usually) broadcasted electronic guide, e.g., an electronic service guide and/or an electronic program guide, for Mobile TV (application) to be used to distribute triggering information.

This can be done by including the required triggering information into a data model of the electronic guide, e.g., related to Purchase Information, Service Information, Content information or Access information, or by creating separate metadata streams dedicated to the transmission of AM triggering information.

Triggering information may comprise filtering parameters, address parameters and/or configuration parameters:

(a) Filtering parameters allow the terminal to detect whether or not to react on the trigger.

(b) Address parameters allow the terminal to fetch a set of configuration parameters.

(c) Configuration parameters configure a terminal to perform the measurement and the actual reporting.

Upon reception of an audience measurement triggering information provided via an electronic guide (e.g., a service guide (SG)) that may in particularly delivered via broadcast, the terminal evaluates the filtering parameters. If the evaluation results in the trigger being accepted, the terminal reacts on the trigger by reading the configuration parameters and starting the measurement as instructed by the configuration, or by reading the address parameters, fetching the configuration parameters via a point-to-point connection as indicated by said address parameters, and starting the measurement as instructed by the configuration. In case both configuration and address parameters are present in the triggering information, the terminal may perform both steps mentioned above, enhancing the configuration parameters received during the first steps with the ones fetched in the second.

Filtering Parameters:

The evaluation of filtering parameters usually involves a random process run by each individual terminal in order to make a decision whether or not to react on a particular trigger, such as computing a random number in a certain range and comparing the result with a given particular number. For instance, the triggering parameters could instruct the terminal to compute a random number between 0 and 100 and react on the trigger if the result was 50. This way, the population of the terminals that react to a trigger can be pruned.

There are numerous ways as how such decision making (for a terminal to decide whether or not to react on a triggering information) can be implemented. Hereinafter, some examples are indicated:

(a) An interval (start and end value) and a value that needs to be the exact result of the random number calculation in order to accept the trigger are signaled.

(b) A percent value between 0 and 100 with a given accuracy is signaled. The terminal calculates a random number between 0 and 100. It reacts to the trigger if the result of that calculation is less than or equal to the signaled percent value.

(c) An interval (start and end values) and a value that needs to be larger than the result of the random number calculation in order to accept the trigger are signaled.

(d) An integer number N is signaled. The probability that the terminal accepts the trigger is 1/N, i.e. the terminal computes a random number between 1 and N and accepts the trigger if the result is N.

It is noted that "random" number herein may refer to a substantially arbitrary or a substantially random number. Functionalities available at electronic devices to compute such numbers may apply. The number calculated does not have to be a real "random" number, it may as well be a pseudo-random number.

For example (a) above, terminal side implementation can be as follows:

1) Terminal receives the audience measurement parameters as part of the broadcasted SG.
2) Terminal reads the probability variable N.
3) Terminal generates a random integer number X between ON.
4) If the X equals N then the terminal activates the audience measurement using the received parameters.

The set of filtering parameters may also include items that are stored within or can be derived by the terminal, such as:

- IMEI, IMSI, MSISDN or ranges thereof;
- user profile data (e.g., sex, ranges of age, interests);
- subscribed services;
- model, brand, type of client device;
- operator of the network into which the client is booked in;
- type of contract;
- validity of the trigger (terminals may only react within the validity interval).

A trigger may include the random calculation or parameter-based filtering or both.

A triggering information may update another trigger that has been provided previously. For example, audience measurement that has been activated before can be disabled by this newly obtained triggering information. Alternatively, a configuration can be changed without changing the set of terminals that participate. For such purpose, a triggering information may comprise an identifier and a command field. The command field may contain a value that signals whether said triggering information is

- a new trigger (case 1),
- a termination trigger (case 2) or
- an update trigger (case 3).

In case a termination trigger is received, the terminal that has at some earlier point in time accepted a new trigger with the same identifier may terminate the measurement and may send the collected results to the server.

In case an update trigger is received, the terminal that accepted a new trigger with the same identifier may send the collected results to the server, may reset its configuration and may then handle the trigger the same way as a new trigger, except that it does not repeat the decision whether or not to accept the trigger.

The set of filtering parameters may comprise XML elements and attributes, name-value-pair, tag-length-value, comma-separated value, scripting language.

For inclusion into the OMA BCAST Service Guide, one or more structured XML elements may be provided to be included into at least one of the following fragments:

- PurchaseItem (describing a set of media assets to which the user can purchase access),
- Service (describing an actual service),
- Content (describing a piece of discrete or time-limited content within a Service),
- Access (describing information how to access content or services),
- Schedule (describing a time interval during which a particular piece of content is available) and
- ServiceGuideDeliveryDescriptor (providing signaling of partition and transmission sessions as well as additional global parameters).

In addition or as an alternative, a dedicated broadcast session may be set up to transmit AM triggering information. An entrance point into such a session may be signaled via a ServiceGuideDeliveryDescriptor. Such a metadata session may reuse transmission schemes as defined for delivering service guide fragments (e.g., Service Guide Delivery Unit (SGDU) encapsulation and underlying a file delivery over unidirectional transport protocol, e.g., FLUTE according to RFC 3926). Another mechanism that can be used to transmit AM triggering information comprises at least one broadcast notification. In the case of OMA BCAST, preferably a type of a notification could be provided, using the extensibility feature of a Notification function.

Hence, advantageously, filtering parameters are provided that allow for the client or terminal to decide whether or not to react on triggering information conveyed by a server. Also the filtering parameters can be utilized on the terminal or client side as how to decide, i.e. which algorithm to apply for such decision making.

Addressing Parameters:

These parameters instruct the terminal to initiate a point-to-point connection to fetch configuration parameters as defined in the next section. Addressing parameters may be included into a broadcasted trigger message. Once a terminal reacts on the trigger and opens a point-to-point connection, the server has the option to reject configuring the terminal based on various criteria. This allows a server-based post-filtering step of the terminals/users to participate in a measurement.

Parameters may include:

- A URL to be used for fetching configuration parameters, using protocols such as HTTP(S), FTP, or the like;
- a list of such URLs with a random selection of one URL for load distribution purposes;
- use of data encryption (disabled, preferred, mandatory);
- use of authentication.

Configuration Parameters:

These parameters instruct the terminal about the actual measurement. They may be included in the broadcasted triggering information or they may be fetched using address information that has been included into the broadcasted triggering information.

The configuration parameters can are represented as XML structures. However, also other suitable representations like comma-separated value, name-value-pairs or tag-length-value may be used.

Configuration Parameters may comprise at least one of the following:

i) Reporting Configuration Parameters:
- start and end time of the measurement campaign;
- destination address for the measurement reports to be sent (e.g., URL for HTTP(S) delivery, telephone number for SMS delivery);
- list of such URLs for load distribution purposes;
- time and frequency of the reporting, optionally with random offsets for load distribution purposes;
- use of data encryption (disabled, preferred, mandatory);
- use of authentication.

ii) Measurement Configuration Parameters:
- What is consumed? E.g., identifiers of service and/or content from the SG, IP addresses and ports of content streams, file names, URLs;
- When and how long is it consumed? E.g., start time and end time or start time and duration;
- Whether or not the end user permission is needed to perform the measurement.

FIG. 1 shows a block diagram comprising a terminal 101 with a mobile broadcast subsystem 102 and an audience measurement (AM) subsystem 103. The terminal 101 is connected via a point-to-point network 104 to an audience measurement (AM) server 105.

This AM implementation for broadcast content individually addresses each terminal that is supposed to take part in a study to trigger and/or to configure it. Triggers are usually sent via SMS towards the terminals to become part of the study and may either contain the full set of configuration parameters or only some parameters which allow the terminal to subsequently fetch the full configuration record over a point-to-point connection, e.g. using HTTP via GPRS/UMTS.

The messages conveyed and illustrated in FIG. 1 can be summarized as follows:

(A) The AM server 105 sends a triggering information (e.g., via SMS or via HTTP) to each terminal 101. The triggering information may comprise address parameters and configuration parameters.

(B) As an option, the AM subsystem 103 in the terminal 101 fetches additional configuration parameters from the AM server 105, e.g. via HTTP.

(C) The AM subsystem 103 in the terminal 101 performs the actual measurements via the mobile broadcast subsystem 102.

(D) The AM subsystem 103 in the terminal 101 reports the measurement results to the AM server 105, e.g., via HTTP or via SMS.

Figure 2:
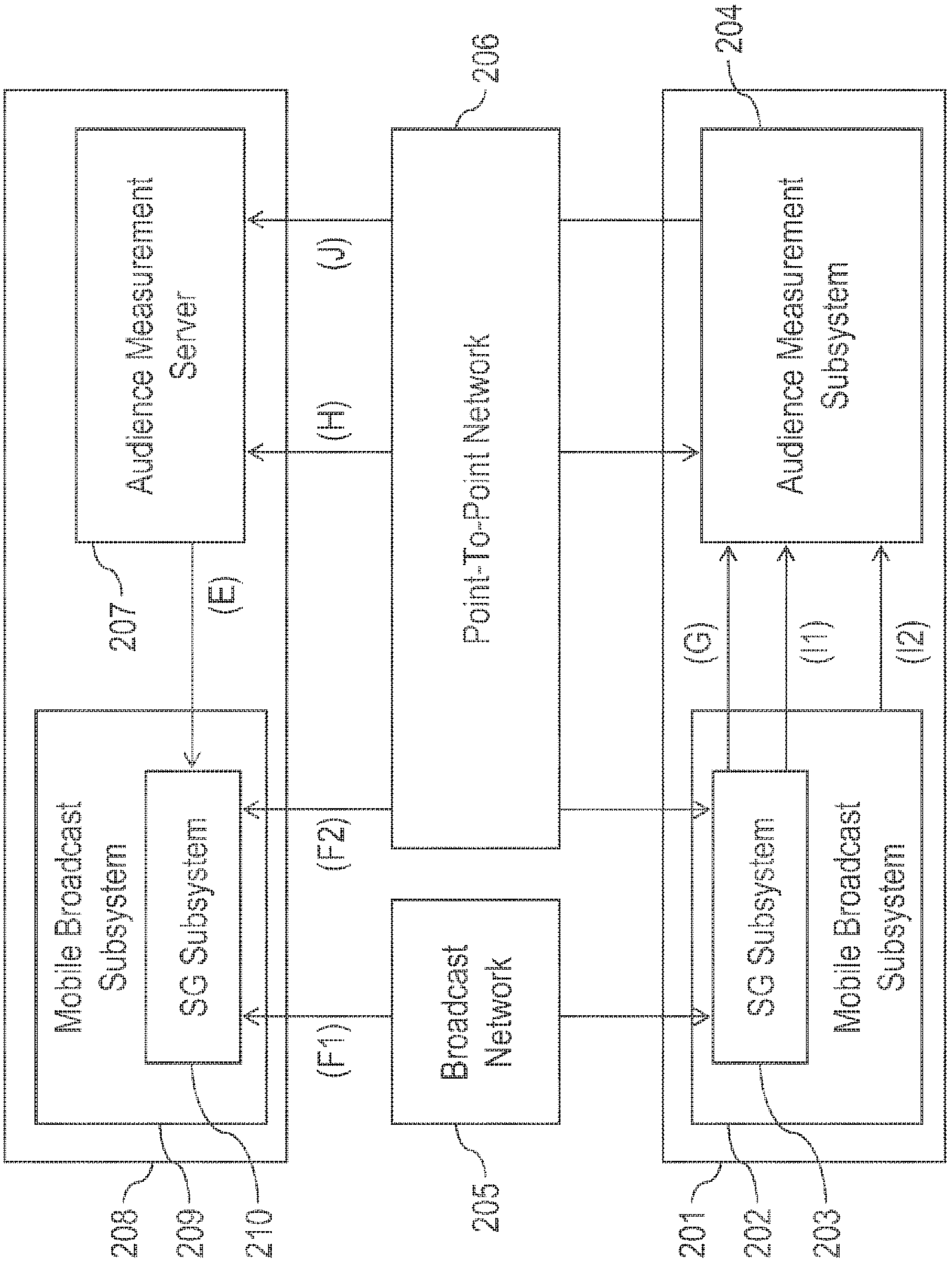
FIG. 2 shows a block diagram of an enhanced audience measurement arrangement compared to that shown in FIG. 1.

FIG. 2 shows a block diagram of an enhanced audience measurement arrangement compared to that shown in FIG. 1.

A server-side 208 comprises an AM server 107 and a mobile broadcast subsystem 209 with an SG subsystem 210. The network comprises a broadcast network 205 and a point-to-point network 206. A terminal 201 comprises an AM subsystem 204 and a mobile broadcast subsystem 202 with an SG subsystem 203.

The data processing of FIG. 2 can be summarized as follows:

(E) The AM server 207 sends a triggering information (as shown and described with regard to FIG. 4) to the SG subsystem 210 to be included in the SG.

(F1) As a default solution, the SG can be transmitted from the SG subsystem 210 to the terminal 201 via the broadcast network 205.

(F2) As an alternative (or in addition), the terminal 201 may request or pull the SG via a bi-directional point-to-point connection 206 from the server 208. This may be realized as a fallback solution.

(G) The SG subsystem 203 conveys the triggering information to the AM subsystem 204, which evaluates the triggering information. If the evaluation requires the terminal 201 to react on the triggering information, the AM subsystem 204 acts upon the trigger by performing the following steps. Otherwise, processing may terminate here.

(H) If instructed, e.g., by the triggering information evaluated, address parameters that may be included in said triggering information may be utilized by the AM subsystem 204 to requests a configuration information from the AM server 207 via the point-to-point network 206.

(I1) The AM subsystem may collect metrics as instructed by measurement configuration parameters that were conveyed with the triggering information and/or pulled in step (H) from the AM server 207. Measurement information can be collected from the SG subsystem 203.

(I2) The AM subsystem may collect metrics as instructed by measurement configuration parameters that were conveyed with the triggering information and/or pulled in step (H) from the AM server 207. Measurement information can be collected from mobile broadcast subsystem 202.

(J) The terminal 201 reports the measurement results via the point-to-point network 206 to the AM server 207, as, e.g., instructed by the configuration parameters.

Figure 3:
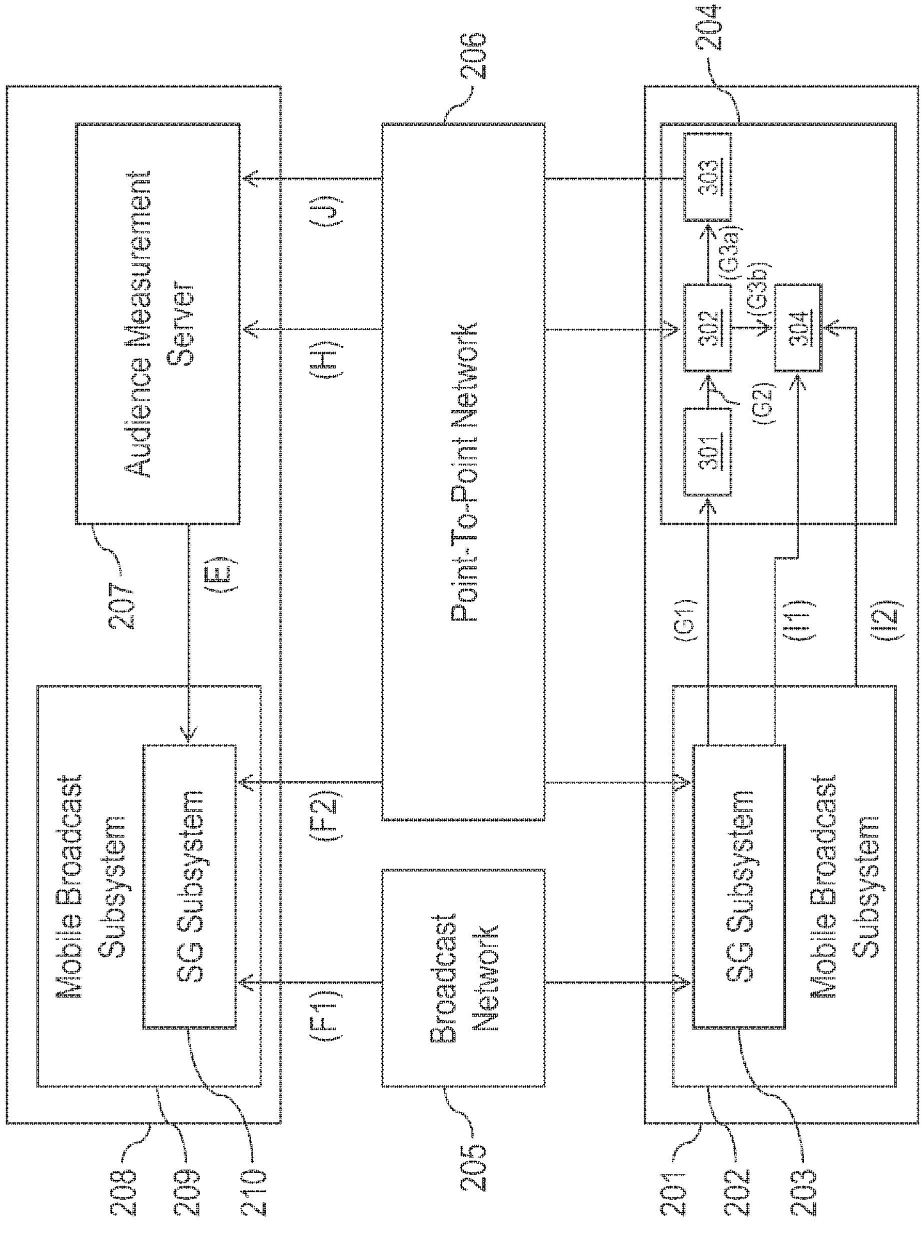
FIG. 3 shows a block diagram based on the block diagram of FIG. 2, wherein the AM subsystem is illustrated in more detail.

FIG. 3 shows a block diagram based on the block diagram of FIG. 2, wherein the AM subsystem 204 is illustrated in more detail. References already used in FIG. 2 apply in FIG. 3 accordingly.

The AM subsystem 204 comprises a decision unit 301 that may receive information (triggering information) from the SG subsystem 203 and is connected to a configuration unit 302, which can be connected to the AM server 207 via the point-to-point network 206. The configuration unit 302 is further connected to a reporting unit 303, which can provide reports via the point-to-point network 206. Also, the configuration unit 302 is connected to a measurement unit 304, which may receive measurement information from either the SG subsystem 203 or from the mobile broadcast subsystem 202.

The data processing of FIG. 3 can be summarized as follows, wherein references already used and described with regard to FIG. 2 may apply accordingly:

(G1) The triggering information is sent from the SG subsystem 203 to the decision unit 301 in the AM Subsystem 204, which performs the evaluation of the filtering parameters as described herein. In case the trigger is not accepted, processing ends here. Otherwise step (G2) and the following steps are executed.

(G2) The decision unit 301 forwards the configuration parameters received in the triggering information to the configuration unit 302. It may optionally instruct the configuration unit 302 to retrieve the configuration parameters based on the address parameters from the AM server 207 (see step (H)).

(G3a) The configuration unit 302 configures the measurement unit 304 based on the measurement configuration parameters and instructs it to start measurement.

(G3b) The configuration unit 302 configures the reporting unit 303 based on the reporting configuration parameters and instructs it to start reporting.

FIG. 4 shows an exemplary notation of a triggering information as an XML data structure. Such structure may be embedded as a sub-element into an OMA BCAST metadata structure serving as a container, or transmitted in a separately broadcasted AM metadata stream. Any OMA BCAST SG fragment, ServiceGuideDeliveryDescriptor or NotificationMessage can be used as such a container.

<RandomSelector> signals the random function to be performed. <TerminalID> signals a range of MSISDNs to address terminals that are expected to react on the trigger. <Address> provides a URL to access a configuration file on an Audience Measurement server. <Configuration> provides a URL to which reports shall be uploaded, a time interval within which the measurement should take place, a list of items to measure, and a time interval for reporting.

In an exemplary deployment, either <Address> or <Configuration> can be initiated. In particular, not both need to be instantiated.

LIST OF ABBREVIATIONS

3GPP 3rd Generation Partnership Project
3GPP2 3rd Generation Partnership Project 2
AM Audience Measurement
BCAST mobile BroadCAST services
BCMCS Broadcast Multicast Service
DVB Digital Video Broadcasting
DVB-H DVB-Handheld
DVB-SH DVB Satellite-to-Handheld
FLO Forward Link Only
FLUTE File Delivery over Unidirectional Transport
FTP File Transfer Protocol
GPRS Generalized Packet Radio Service
HTTP Hypertext Transfer Protocol
HTTPS Hypertext Transfer Protocol Secure
IMEI International Mobile Equipment Identity
IMSI International Mobile Subscriber Identity
MBMS Multimedia Broadcast Multicast System
MSISDN Mobile Subscriber ISDN Number
OMA Open Mobile Alliance
SG Service Guide
SGDU Service Guide Delivery Unit
SMS Short Message Service
UMTS Universal Mobile Telecommunication System
URI Uniform Resource Identifier
URL Uniform Resource Locator
XML Extensible Markup Language

The invention claimed is:

1. A data processing method, which comprises:
- providing a triggering information to a plurality of clients via an electronic guide; and
- determining by each of the plurality of clients based on the triggering information whether or not to react to the triggering information,
- wherein the triggering information comprises at least one configuration parameter, and
- wherein a reaction by a client to the triggering information comprises requesting and/or reading configuration parameters from at least one server.

2. The method according to claim 1, wherein each of the plurality of clients determines via filtering parameters whether or not to react to the triggering information.

3. The method according to claim 1, which comprises broadcasting the triggering information to the plurality of clients.

4. The method according to claim 1, wherein the client requests and/or reads the configuration parameters from the at least one server by way of a point-to-point connection.

5. The method according to claim 1, which comprises selectively allowing or rejecting configuring the client by the at least one server.

6. The method according to claim 1, wherein the client starts a measurement and/or tracking process according to the configuration parameters.

7. The method according to claim 6, which comprises conveying a result of the measurement and/or tracking process to the at least one server.

8. The method according to claim 1, wherein the client reacts to the triggering information as a result of a random process run at the client.

9. The method according to claim 8, wherein the random process comprises:
- computing a substantially arbitrary number and comparing the substantially arbitrary number with a given number or a given range of numbers;
- if the substantially arbitrary number and the given number or the given range of numbers match, reacting by the client to the triggering information.

10. The method according to claim 9, which comprises computing the substantially arbitrary number within a given range.

11. The method according to claim 1, wherein the filtering parameters comprise items that are stored within, or are derivable by the client.

12. The method according to claim 11, wherein the filtering parameters comprise at least one of the following:
- IMEI, IMSI, MSISDN or ranges of the client;
- user profile data;
- subscribed services;
- model, brand, type of client device;
- operator of the network into which the client is booked in;
- type of contract;
- validity of the trigger.

13. The method according to claim 1, wherein the triggering information indicates for each of the plurality of clients how to determine whether or not to react on said triggering information.

14. The method according to claim 1, wherein the triggering information comprises a command field indicating whether the triggering information is
- a new trigger;
- a termination trigger; or
- an update trigger.

15. The method according to claim 1, wherein the electronic guide comprises an electronic service guide, an electronic program guide, or a notification mechanism.

16. A device, comprising a processor or a unit associated with a processor and/or a hard-wired circuit and/or a logic device configured to carry out a data processing method by carrying out the following steps:
- providing a triggering information to a plurality of clients via an electronic guide;
- and
- determining by each of the plurality of clients based on the triggering information whether or not to react to the triggering information,
- wherein the triggering information comprises at least one configuration parameter, and
- wherein a reaction by a client to the triggering information comprises requesting and/or reading configuration parameters from at least one server.

17. The device according to claim 16, configured as a communications device.

18. The device according to claim 16, wherein said communication device is a client, a unit associated with a client, a server, or a unit associated with a server.

* * * * *